No. 890,012. R. H. ANDERSON. PATENTED JUNE 9, 1908.
PERCUSSION ROCK DRILL.
APPLICATION FILED JAN. 23, 1908.
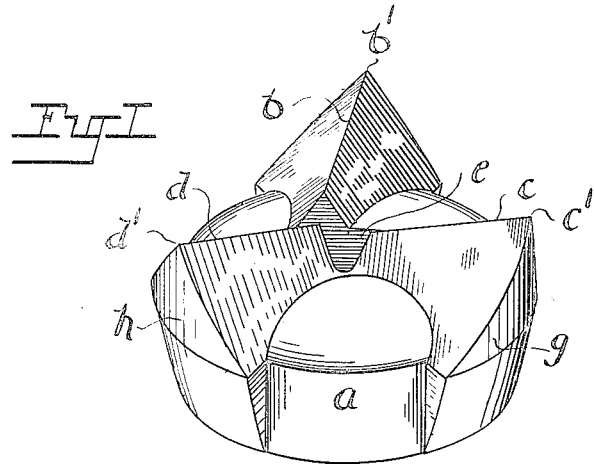
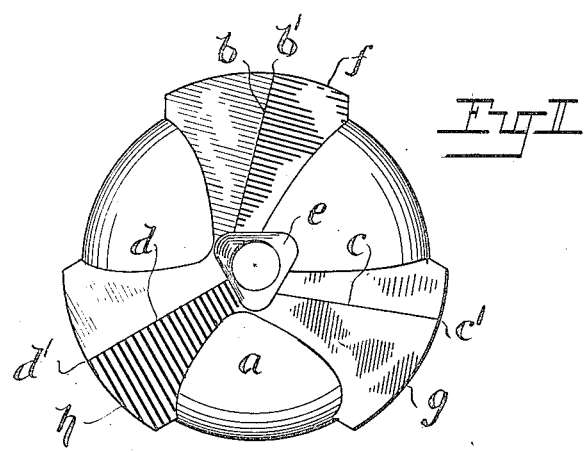
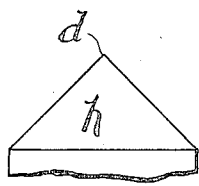 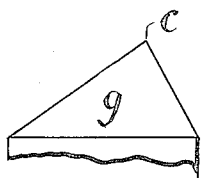 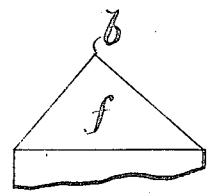
 
Witnesses:
C. N. Crawford
E. Schallinger
Inventor:—
Robert Hutchison Anderson
by B. Singer
Attorney

UNITED STATES PATENT OFFICE.

ROBERT HUTCHISON ANDERSON, OF JOHANNESBURG, TRANSVAAL.

PERCUSSION ROCK-DRILL.

No. 890,012.

Specification of Letters Patent.

Patented June 9, 1908.

Application filed January 23, 1908. Serial No. 412,357.

*To all whom it may concern:*

Be it known that I, ROBERT HUTCHISON ANDERSON, a citizen of the United States, residing at Marlborough House, Doornfontein, Johannesburg, in the colony of the Transvaal, have invented a new and useful Improvement in Percussive Rock-Drills, of which the following is a specification.

The present invention relates to percussive rock drills of the general type wherein a plurality of more or less radial cutting edges are separated by spaces for the passage of broken rock and wherein the peripheral surfaces adjacent to the cutting edges form guide faces for the drill.

Such drills have hitherto as a rule been constructed with the cutting edges symmetrically disposed, with the result that although the drill is rotated to prevent its constantly striking upon the same spot, the edges still tend to a great extent to follow one another, or in other words, any one edge tends to strike in the notch produced by a preceding edge. This impairs the rate of drilling and produces rifling of the hole, the cross section of which becomes a polygon having one more side than there are symmetrically disposed cutting edges on the drill.

In a prior application (Serial No. 355982) I have described a drill in which the points of the cutting edges, (by which the bulk of the cutting is effected and which determine the shape of the hole), are unequally spaced, thus giving the equivalent as far as the prevention of rifling is concerned, of a bit having a very large number of cutting edges; and increasing the efficiency of the drill by causing the cuts to be distributed widely over the rock face as the drill rotates. In such drill however, the angle of the cutting edges is uniform, and the peripheral guiding surfaces formed by the outer ends thereof as mentioned above, are unequally spaced, which somewhat impairs the guiding of the drill.

It is the object of the present invention to provide a drill in which the points of the cutting edges are unequally spaced as in my prior invention, but in which the guiding faces be improved by reason of the guiding faces being equally spaced; and in which also the angles of the several cutting edges are unequal, or differently disposed, thereby producing certain advantages in operation as hereafter mentioned.

In the accompanying drawing Figure I is a perspective view of the improved bit, and Fig. II a plan of the same; Figs. III, IV and V, are projections of the guiding surfaces thereof, and Figs. VI and VII illustrate a feature in the operation of the drill.

The drill here illustrated is of the general type described in my prior application wherein a detachable drill cap comprises a body portion $a$ and raised cutting edges $b$, $c$, $d$, formed integral therewith. The cap is adapted to be secured to a permanent shank by means of a tie rod having a triangular tapered head which fits into the corresponding hole $e$ in the cap.

The drill has preferably three cutting edges $b$, $c$, and $d$, of which the points $b^1$, $c^1$, and $d^1$, respectively are unequally spaced; there being in the present case an angle of 100° between $b^1$ and $c^1$, 135° between $c^1$ and $d^1$, and 125° between $d^1$ and $b^1$. The edges may be radial in plan as in the ordinary drills; or they may be irregularly disposed as shown, for the purpose of diminishing the tendency of any part of one edge to follow the preceding edge. The points of the edges are preferably disposed in advance of the central parts thereof with the object of assisting the rock to burst inwardly to the center when struck.

$f$, $g$, and $h$, are the guiding faces, which are equidistant from the center of the drill and are disposed symmetrically around the periphery thereof. Such symmetry of the guiding faces combined with the asymmetry of the points causes the respective angles of the edges to be dissimilarly disposed and usually also unequal in magnitude.

As seen in Figs. III, IV, and V, the angle of the edge $d$ is symmetrically disposed with reference to the axis of the drill, while those of the other edges are, as it were, tilted, but in opposite directions. As illustrating the effect of this arrangement in cutting the rock, Fig. VI represents the edge $d$ punched into the rock and forming therein a corresponding V notch. Were the cutting angles all similar, a following cutter which happened to strike in the same place would exactly fit the notch, and, making contact with the whole surface thereof, would require considerable force to cause it to penetrate. On the other hand supposing the edge $c$ of the present drill to follow, it would make contact with the rock at two points only, as seen in Fig. VII, in which penetration is supposed to have begun. The blow is thus concentrated and produces a correspondingly better result; for example the large corner of rock on the left hand side of Fig. VII is readily broken off and at the same time the penetration of the point of the cutter is comparatively unimpeded.

It is to be understood that although the invention has been described and illustrated only in connection with a drill of the type comprising a complete detachable head, to which it is evidently for manufacturing reasons most readily applicable, it may nevertheless be applied to drills having a plurality of detachable cutters or to solid drills having the cutting parts forged on the shank.

What I claim as my invention, and desire to secure by Letters Patent, is:—

1. A percussive rock drill having a plurality of cutting edges, guiding faces formed at the peripheral extremities thereof; the points of the cutting edges being unsymmetrically arranged and the guiding faces being symmetrically arranged.

2. A percussive rock drill having a plurality of cutting edges and guide faces formed at the peripheral extremities thereof; the points of the cutting edges being unsymmetrically arranged, the guide faces being symmetrically arranged and the angles of the cutting edges being differently disposed relatively to the axis of the drill.

3. In a percussive rock drill a plurality of cutting edges and a plurality of guiding faces disposed at the peripheral extremities thereof, said cutting edges being unequally spaced and said guiding faces being equally spaced, substantially as described.

In testimony whereof I affix my signature in presence of two witnesses.

ROBERT HUTCHISON ANDERSON.

Witnesses:
ALFRED L. SPOOR,
WESLEY E. JOHN.